United States Patent [19]

Strickland

[11] Patent Number: 4,619,069
[45] Date of Patent: Oct. 28, 1986

[54] DOUBLE TAILED FISH BAIT

[76] Inventor: Richard C. Strickland, P.O. Box 1136, LaBelle, Fla. 33935

[21] Appl. No.: 673,670

[22] Filed: Nov. 21, 1984

[51] Int. Cl.⁴ ............................................. A01K 85/00
[52] U.S. Cl. .................................. 43/42.26; 43/42.28
[58] Field of Search ............... 43/42.24, 42.26, 42.28; D22/27

[56] References Cited

U.S. PATENT DOCUMENTS

| | | | |
|---|---|---|---|
| D. 239,281 | 3/1976 | Williams | 43/42.24 |
| D. 241,346 | 9/1976 | Carver | D22/27 |
| D. 251,009 | 2/1979 | Stutzman | D22/27 |
| D. 256,495 | 8/1980 | Brown | D22/27 |
| 3,100,360 | 8/1963 | Creme | 43/42.24 |
| 3,802,115 | 4/1974 | Auten | 43/42.24 |
| 4,047,318 | 9/1977 | Mapp | 43/42.24 |
| 4,316,343 | 2/1982 | Creme | 43/42.28 |

Primary Examiner—Gene P. Crosby
Attorney, Agent, or Firm—Alfred E. Wilson

[57] ABSTRACT

A fish bait consisting of a double tailed plastic lure having an elongated body section wherein the fisherman's line and the shank of the hook project through the forward end of the body section and the barb end of the hook is projected into the body section adjacent the rear end thereof to hold the hook and to ready it for use. Oppositely directed leg members extend laterally in opposite directions at substantially 90° angular relation to the rear end of the body section and have progressive outwardly, forwardly, inwardly and rearwardly curved tapered flexible terminal end portions that are deflected in opposite directions as the bait is projected through the water.

2 Claims, 4 Drawing Figures

DOUBLE TAILED FISH BAIT

BACKGROUND OF THE INVENTION

In the art of fishing it is desirable to employ a bait that will have a high degree of flexibility in the water as the bait is pulled through the water either by a casting operation, or as the bait is pulled through the water in a trolling operation to attract the attention of the fish in the area. It is, of course, desirable that the bait be shaped to have the appearance of the natural food that the fish is accustomed to encountering in the area in which the fisherman is doing his fishing.

Various fish baits formed of flexible plastic lure members have been employed heretofore, many of them having angularly related legs that project outwardly and downwardly from the rear end of the bait. Some of these specimens have tapered and contoured members that can move relative to each other and to the body of the bait to attract the attention of the fish in the area to the bait. Fish lures of this general type have a tendency to encounter difficulties because the angularly disposed legs become tangled with each other or cause a spinning of the lure which is undesirable in that the line becomes fouled, and which will interfere with the free-running of the line on the reel.

FIELD OF THE INVENTION

More particularly this invention is directed to the provision of a fish lure of the plastic type having a body section wherein angularly related legs are separated widely so that there is no danger of the legs becoming entangled with each other and which will induce the line and bait to run true without rotating on its axis to cause difficulties with the wind-up mechanism of the reel.

Specifically, plastic lure baits having elongated bodies and angularly related legs extending downwardly and outwardly at angles of approximately 45° have heretofore been devised. These lure type baits have caused serious difficulties and have not been productive of a high percentage of fish catch because the ends of the legs have not been shaped to exert a desired degree of fish attraction as the lure is moved through the water to attract fish to the extent that is necessary to permit a fisherman to have a high fish percent catch.

SUMMARY OF THE INVENTION

This invention consists of a double tailed plastic lure having right angularly related legs at the rear end of a body section wherein the legs are tapered in shape, and extend outwardly in opposite directions at substantially 90° angles relative to the body section so that there is no danger of the leg members becoming entangled with each other and to permit each leg freedom of movement to attract fish. The leg portions extend outwardly, and have gentle curves forwardly, then inwardly toward the body section, and then rearwardly to produce thin flexible members of decreasing thickness to produce a high degree of flexibility of the members so that attention getting movement of the flipper type leg members is possible.

An object of this invention is therefore to provide a fish bait lure having a body section terminating at the front end, and oppositely directed leg members of progressively decreasing thickness to increase the flexibility of the flipper type leg members to induce a balanced attention getting disturbance as the bait is projected through the water to attract fish in the area.

Another object is to provide a fish bait of the plastic lure type having a body section and oppositely right angularly extended leg members at the rear end of the body section to attract the attention of the fish in the area to the bait, and wherein a hook is concealed in the body section ready to impale a fish that mistakes the bait for an appetizing morsel of food.

DESCRIPTION OF THE PREFERRED EMBODIMENT

Figure 1:
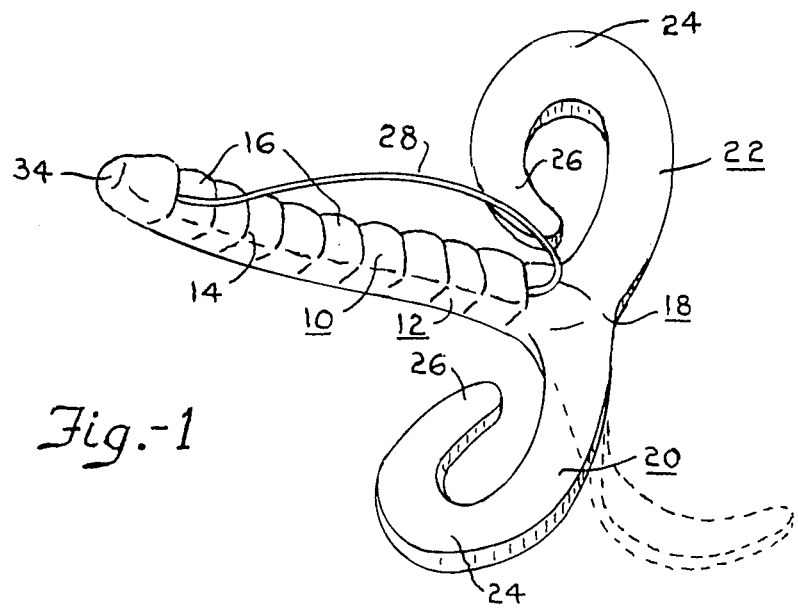
FIG. 1 is a perspective view of a fish bait of the plastic lure type embodying this invention.
Figure 2:
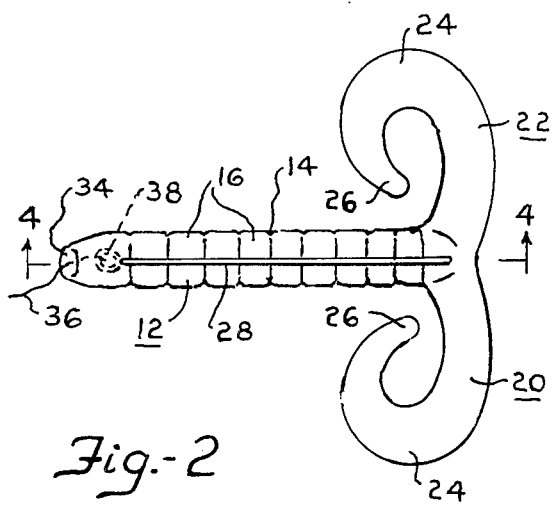
FIG. 2 is a plan view of the bait.
Figure 3:
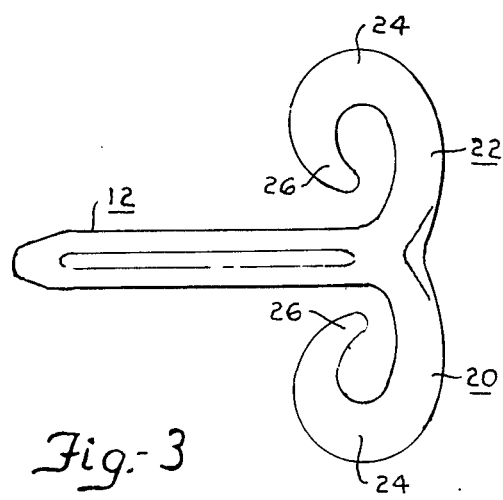
FIG. 3 is a view similar to FIG. 2, but showing the bait from the opposite side.
Figure 4:
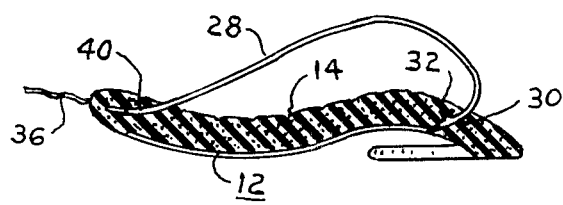
FIG. 4 is a sectional view taken substantially on the line 4—4 of FIG. 2 looking in the direction of the arrows.

Referring now to the drawings, FIG. 1 is a perspective view of a double tailed plastic fish bait 10 embodying the invention. The fish bait 10 is made of rubber plastic material, and is shaped by pouring a suitable quantity of liquid plastic material into an open topped mold formed of plaster of Paris or of other suitable mold forming substance. The plastic material is quick drying and will solidify in a very few minutes when exposed to the air. It solidifies to a pliable plastic entity conforming to the shape and contour of the cavity of the mold.

The fish bait 10 has an elongated body section 12 having forward and terminal or rear ends, and having a plurality of transverse corrugations 14 to simulate the segmented worm-like segments 16 of a worm, and to render the body section 12 flexible to a considerable degree, and to give it the appearance, when moved in the water of a worm advancing by wriggling. The bait also resembles a frog or a crayfish or a shrimp. The terminal or rear end 18 of the body section 12 is provided with a pair of oppositely extended tapered leg members 20 and 22 extending in opposite directions at substantially right angular relations from the body section 12. The legs 20 and 22 have upwardly curved sections 24 and inwardly and downwardly curved terminal sections 26. The leg members 20 and 22 are substantially flat and they are relatively thin having progressively thinner sections toward the ends to permit the leg members to flop around as shown by the dotted lines in FIG. 1 as the fish bait 10 is pulled through the water.

To apply the fish catching hook 28 to the fish bait 10 the fish catching end 30 of the hook 28 where the fish holding barb 32 is located is projected through the front end 34 of the body section 12 with the fish line 36 secured in the eye 38 of the hook 28 at the end of the shank 40. The hook 28 is threaded through the body section 12 for a sufficient distance to insure proper guidance of the line 36 through the body section 12. The hook is then projected out of the body section 12 through one of the segments 16 to insure proper guidance of the line 36, and the fish catching end 30 of the hook 28 is projected into the body section 12 near its terminal or rear end 18, preferably slightly forward of the legs 20 and 22. This insures a so-called weedless bait because the fish catching end 30 of the hook 28 is buried in the plastic body section so that any weeds that the bait is moving over will not engage the hook, and will slide over the bait. The hook, of course, is readily available to catch and hold a fish when the bait is grabbed by the fish.

In operation the fish bait or lure 10 is assembled with a line 36 and the hook 28 is applied to the body section 12. The fish bait 10 can be used for casting with a casting reel, or by trolling wherein the fish bait 10 is secured to the line 36, and is pulled through the water by a boat. Whatever means is employed to cause the bait 10 to move through the water, the legs 20 and 22 with their upwardly curved sections 24 and the inwardly and downwardly curved terminal sections 26 of progressively reduced thicknesses cause the legs to move around extensively as shown for example in the dotted lines of FIG. 1. The faster the bait is projected through the water, the more movement there is by the flexible portions 24 and 26 in the legs 20 and 22. This causes considerable disturbance in the water to attract the attention of any fish that may be lurking in the area where the fishing operation is in progress.

Another means of fishing which I have found to be very effective with my improved bait is the so-called flipping technique wherein the bait 10 is flipped into a hole or portion of a water body believed to have fish in it, preferably a hole, and when a fish strikes the bait the line is jerked sharply to impale the fish on the hook 28, with a sufficient force to flip the fish out of the water and into the boat or other place where the fisherman is standing.

This bait, having the widely spread legs, overcomes the serious objections that grub type baits have encountered in that the legs of the other baits are not sufficiently spread apart to prevent them from tangling with each other whereupon a very undesirable situation exists which frequently will cause curling or twisting of the tail of the lure bait or entanglement of the same causing less flexibility.

Also, it should be noted that with my improved bait the forces are substantially balanced and the bait will thus flow through the water without the exertion of a twisting action which could cause the line to be twisted and which frequently results in tangling of the line.

I have had extremely good results with this bait in that the spread apart legs having progressively decreasing thicknesses will induce a rapid and easy movement as the bait is projected through the water, thereby extending an invitation to any fish in the area to investigate to see what is causing the commotion in the water.

I claim:

1. A fish bait comprising a plastic lure having an elongated body section having forwardly and rearwardly disposed ends, symmetrically disposed oppositely extending substantially flat surfaced leg members aligned with each other and extending in opposite directions at substantially right angles relative to the elongated body section from a point at the rear end of the body section, the oppositely extending leg members being symmetrical and being a mirror image of each other and having uninterrupted successively spaced outwardly, forwardly, inwardly and rearwardly extending curved sections of progressively decreasing cross section in both thickness and width to induce the terminal ends of each of the leg members to deflect in varying directions as the bait is projected through the water.

2. The invention defined in claim 1 wherein a line is projected through the forward end of the body section and the fish catching end of the hook is projected into the body section adjacent the terminal end thereof to provide a weedless type lure.

* * * * *